Figure 1:
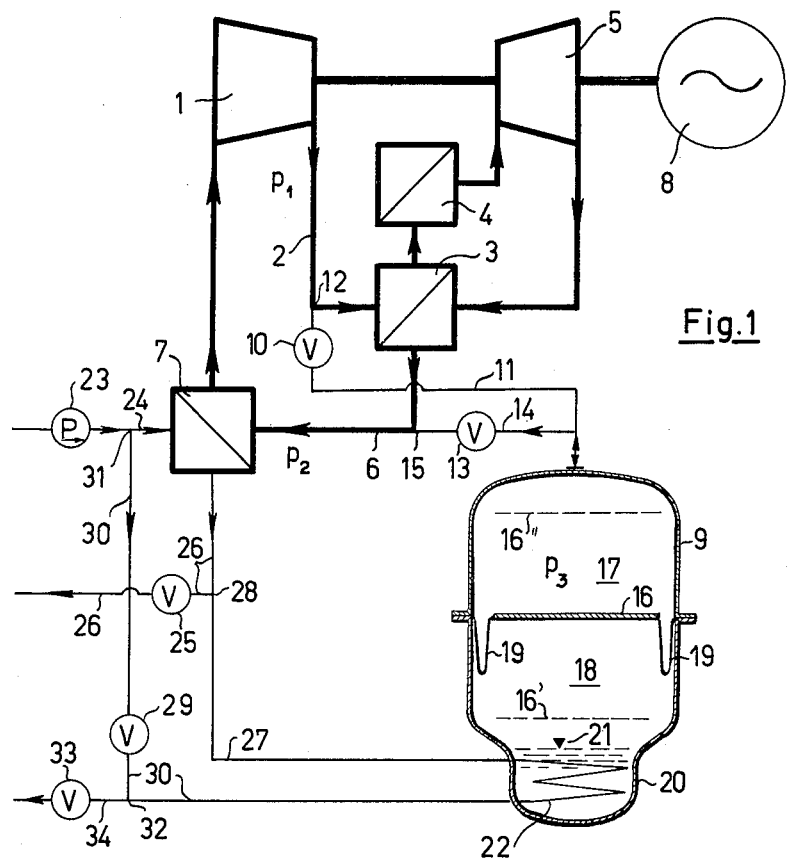

Nov. 30, 1965           M. BERCHTOLD           3,220,191

VARYING THE PRESSURE LEVEL OF A CLOSED-CYCLE GAS TURBINE PLANT

Filed May 14, 1962

INVENTOR.

MAX BERCHTOLD

BY

Dodge and Sons

ATTORNEYS

United States Patent Office 3,220,191
Patented Nov. 30, 1965

3,220,191
VARYING THE PRESSURE LEVEL OF A CLOSED-CYCLE GAS TURBINE PLANT
Max Berchtold, Zurich, Switzerland, assignor to Escher Wyss Aktiengesellschaft, Zurich, Switzerland, a corporation of Switzerland
Filed May 14, 1962, Ser. No. 194,463
Claims priority, application Switzerland, May 25, 1961, 6,076/61
7 Claims. (Cl. 60—59)

An advantageous possibility of varying the power output of a closed-cycle gas turbine plant consists in known manner in varying the pressure level in the circuit, gaseous working medium being introduced into the circuit from the outside for increasing the power output, and working medium being withdrawn from the circuit for reducing the power output. The compression and expansion of the working medium then occur at constant Mach numbers. Only the density of the gases flowing through the turbo-machines and heat exchangers varies, and the power output of the plant is substantially proportional to the working medium density, provided the working medium before expansion is heated to an always constant temperature by suitable adaptation of the heat supply. If air is used as working medium, this can be forced into the plant from the surroundings in a simple manner by means of reciprocating or rotary compressors. For reducing the power, air is discharged into the surroundings.

If, on the contrary, in such a gas turbine plant helium is used as working medium, for example, which is found to be particularly favourable in connection with gas-cooled atomic nuclear reactors, the helium is preferably not stored at ambient pressure, since otherwise the necessary storage volume would be excessively large. The working medium withdrawn from the gas turbine plant for reducing its power is received in a pressure storage reservoir. For given maximum pressure and minimum pressure in the storage reservoir, the volume of the storage reservoir is determined by the quantity of gas to be withdrawn from the gas turbine plant. A substantial difficulty thereby arises in that in connection with gas-cooled atomic nuclear reactors, oil-lubricated machines may not be used for the compression of the helium.

The invention now relates to a device for varying the pressure level in a closed-cycle gas turbine plant which has a storage reservoir for receiving the working medium to be released from the circuit in the case of pressure level reduction. According to the invention, a movable partition is provided in this storage reservoir, said partition subdividing the reservoir into two spaces, sealed off from each other, one of which serves for storing the working medium of the gas turbine plant. For varying the position of the partition and hence the capacity of said storage space, the other space is furthermore filled with a medium partly in the liquid and partly in the gaseous phase, means being provided for varying the enthalpy of this medium.

In this way, a simple device is provided for varying the pressure level in the gas turbine circuit, which obviates the aforesaid difficulty and which can also be used for atomic power plants with helium as working medium and reactor cooling gas.

Figure 2:
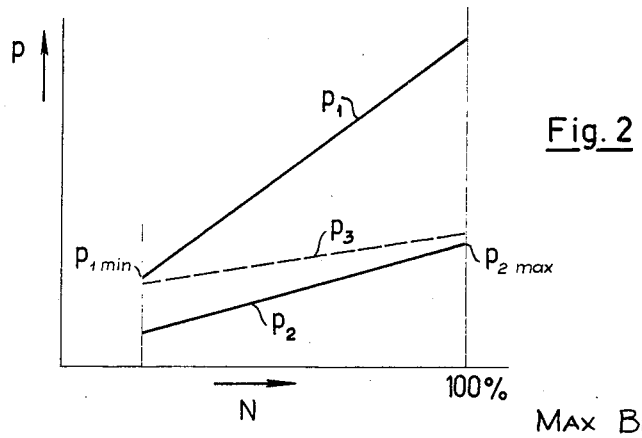

FIG. 1 of the drawings represents in simplified form a constructional example of the invention. FIG. 2 is a diagram representing for example the variation of the circuit pressures and storage pressure as a function of the useful power of the plant.

The pressure of the working medium of the closed-cycle gas turbine plant is increased in a compressor 1 from an initial pressure to a higher pressure; the compressed working medium then passes by way of a pipe-line 2 to a heat exchanger 3 and thereupon to a heater 4, which for example may be formed by an atomic nuclear reactor. The working medium, heated in the heat-exchanger 3 and heater 4, thereupon expands in a turbine 5 while doing work. The working medium thus expanded flows through the heat exchanger 3, in which it gives up heat to the compressed working medium and is finally, by means of a pipe-line 6, supplied to a cooler 7, whence it passes again to the compressor 1, thus completing the cycle. The turbine 5 drives the compressor 1, and in addition delivers useful power to an electric generator 8.

To be able to produce a pressure-level variation in the working circuit and hence a variation in the power output, there is furthermore provided a device having a working medium storage reservoir 9. The latter is connected by a pipe-line 11 with valve 10 to a point 12 of pipe-line 2 carrying compressed working medium at a pressure $p_1$. A further pipe-line 14 with valve 13, connects the storage reservoir 9 to point 15 of the pipe-line 6 of the working circuit, carrying expanded working medium at a pressure $p_2$. By opening the valve 10 or the valve 13, the storage reservoir can be connected to pipe-line 6 of the low-pressure side of the circuit, i.e. to the flow path of the compressed working medium, or to pipe-line 6 of the low-pressure sideo f the circuit, i.e. to the flow path of the expanded working medium.

In the reservoir 9 there is now provided a movable partition 16, subdividing the reservoir 9 into two spaces 17 and 18. Space 17 serves for storing the working medium of the gas turbine plant, and can be connected to the circuit of the gas turbine plant by means of pipe-lines 11 and 14. A fluid-tight closure between the spaces 17 and 18 is provided by an annular diaphragm 19, which connects the partition 16 to the wall of the storage reservoir, and is so flexible that it permits movement of the partition 16 between the end positions 16' and 16''.

For varying the position of the partition and hence the capacity of the storage space 17, the other space 18 is filled with a medium which is partly in the liquid and partly in the gaseous phase. The liquid phase of this medium is mainly contained in a bulge 20 in the bottom of the storage reservoir 9, and the level of the liquid is at a position 21. In the liquid space of the storage reservoir 9, there is furthermore a heat exchanger 22, by means whereof the enthalpy of the medium in the space 18 can be varied.

A pump 23 is provided for supplying cooling water to the plant. This water flows on the one hand through a pipe-line 24 to the cooler 7. After being heated in this cooler 7, it flows away through a pipe-line closable by means of a valve 25. In order now to be able as required to supply heat to or remove heat from the medium contained in space 18 of the storage reservoir 19, one end of the heat exchanger 22 is connected by a pipe-line 27 to a point 28 of pipe-line 26, while the other end of the heat exchanger 22 is connected by a pipe-line 30, provided with a valve 29, to a point 31 of the pipe-line 24 carrying fresh cooling water. There is also connected to a point 32 of pipe-line 30 a discharge pipe 34 provided with a valve 33.

If the medium in the space 18 is to be cooled, the valves 25 and 29 are opened and valve 33 is closed. Fresh cooling water then flows from the point 31 in parallel through the pipe-line 24 to the cooler 7 and through pipe-line 30 to the heat exchanger 22, and the cooling water leaving the cooler 7, together with the water coming through the pipe-line 27 from the heat exchanger 22, is discharged from the point 28 by way of the valve 25.

If, on the contrary, the medium in the space 18 is to be heated by means of the heat exchanger 22, the valves 25 and 29 are closed and the valve 33 is opened. In this case, fresh cooling water can pass only to the cooler 7. Since the valve 25 is closed, the water heated in the cooler 7 flows from point 28 of the pipe-line 26 through the pipe-line 27 to the heat exchanger 22, where it gives off heat to the liquid phase of the medium in space 18 of the storage reservoir 9. Thereupon, it flows through pipe-line 30 and from point 32 of this pipe-line is discharged through pipe 34 and valve 33.

By means of this arrangement, it is possible to keep the working medium stored in the reservoir 9 for example at constant pressure, despite the variable storage quantity. For this purpose, it is merely necessary to select for filling the space 18 a medium, the evaporation temperature of which at the selected storage pressure lies between the temperature of the fresh cooling water and that of the cooling water heated in the cooler 7.

If the storage volume of the space 17 is to be reduced, heated cooling water is allowed to flow through the heat exchanger 22 until an appropriate quantity of the medium in space 18 has evaporated for moving the partition 16 upward while maintaining the same pressure in the space 17. To increase the storage space on the other hand, the heat exchanger 22 is charged with fresh cooling water so that part of the gaseous phase of the medium in space 18 condenses and the partition 16 correspondingly moves downward. Due to the compliance of the partition 16, the pressure in space 17 is always practically equal to the vapor pressure of the medium in space 18.

FIGURE 2 shows a pressure diagram, in which the high pressure $p_1$ and low pressure $p_2$ of the gas turbine plant are plotted against useful power output N. In order, simply by operation of the valves 10 and 13, to produce a variation in working medium content of the gas turbine circuit and hence of the pressure level, the storage reservoir pressure must lie between the pressures $p_1$ and $p_2$ throughout the entire regulating range. Release of working medium from the plant into the reservoir is then possible by opening of the valve 10, while for admission of working medium from the reservoir to the plant, valve 13 must be opened.

Since in the regulating range provided according to FIG. 2, the minimum value of pressure $p_1$ is lower than the maximum value of pressure $p_2$, maintenance of a constant pressure in the reservoir does not satisfy the above-mentioned condition. It is therefore assumed that the storage reservoir pressure $p_3$ varies according to a line which also increases with increasing power. Such a pressure variation can be obtained by suitable supply of cold or hot water in the heat exchanger 22 such that the temperature of the medium in space 18 is regulated to a higher value in the case of full load than in the case of partial load.

Instead of being charged with cooling water of the plant, as shown, without departing from the scope of the invention, the heat exchanger 22 could be charged with any other heat-transfer medium having the necessary temperature. As such a medium, it would also be possible to use for example working medium extracted at a point of suitable temperature of the working circuit of the gas turbine plant. If necessary, electrical heating of the medium in space 18 could also be considered.

Instead of the heat exchanger 22 being arranged in space 18 of the working medium storage reservoir 9 itself, a portion of the medium of space 18 could be circulated for example through a heat exchanger arranged outside the storage reservoir 9. Other circuits for the heat-transfer medium of the heat exchanger 22 are also conceivable, for example charging of this heat exchanger with cooling water partly heated in the cooler 7, or with a temperature-adapted mixture of fresh cooling water and discharge water from the cooler 7.

Propane may be used for example as filling of the space 18. If, for example, on the high-pressure side of the working circuit, the lowest pressure occurring in the regulating range $p_{1\,min}=10$ atm. abs., and on the low-pressure side, the highest pressure occurring in the regulating range $p_{2\,max}=22.5$ atm. abs., the propane at the highest position 16″ of the partition 16 must be kept at a temperature of at least 62° C., and at the lowest position 16′ of the partition 16, it must be kept at a temperature of at the most 26° C. These temperatures are the evaporation temperatures of propane at the given pressures $p_{1\,min}$ and $p_{2\,max}$. For example, if the fresh cooling water has a temperature of 20° C. and the water leaving the cooler 7 has a temperature of 70° C., by suitable adjustment of the valves 25, 29, 33, it is possible to regulate the necessary temperature in the space 18, situated between the temperatures 28° C. and 62° C., and hence also the desired reservoir pressure. For a 10 mw. helium plant and a variation in power in the range between 20% and 100%, a necessary storage capacity of 52 m.³ was calculated. To boost the gas turbine plant from the pressure level for 20% load to that for 100% load, an amount of propane, filling this space of 52 m.³ between the positions 16′ and 16″ must be evaporated, with simultaneous increase in pressure from 10 atm. abs. to 22.5 atm. abs. The choice of this medium permits the waste heat of the working cycle to be used in the present case so that additional power is not required.

Advantageously, an automatic regulating device is provided which either regulates the temperature of the medium in space 18 or directly the storage pressure to a value predetermined by the loading of the plant, or of a pressure in the plant ($p_1$ or $p_2$) or possibly to a constant pressure.

Apart from butane, other media, such as for example isobutane or sulphur dioxide may be used for filling the space, depending on the pressures and temperatures concerned.

What is claimed is:
1. In combination
   (a) a closed-cycle gas turbine power plant having a closed circuit for a gaseous working medium comprising compressing means, heating means, turbine means, cooling means, and a flow path for leading working medium through these four means in sequence; and
   (b) a device for varying the pressure level in said circuit comprising
      (1) a storage reservoir,
      (2) a movable partition within said reservoir and dividing its interior into two spaces sealed from one another,
      (3) at least one flow connection including closure means leading from the working medium flow path to one of said reservoir spaces,
      (4) a medium partly in liquid phase and partly in gaseous phase filling the other reservoir space, and
      (5) heating and cooling means for varying the enthalpy of the mixed phase medium.
2. The combination defined in claim 1 in which the mixed phase medium is one of the substances propane, butane, isobutane and sulphur dioxide.
3. The combination defined in claim 1 in which said movable partition includes a diaphragm connected with a wall of the storage reservoir.
4. The combination defined in caim 1 in which said flow connection comprises
   (a) a first conduit including a closure member connecting said one reservoir space with a point on the working medium flow path containing compressed working medium; and
   (b) a second conduit including a closure member connecting said one reservoir space with a point on the working medium flow path containing expanded working medium.

5. The combination defined in claim 1 in which the gas turbine power plant includes a flow path for leading a cooling medium through the cooling means; and in which the heating and cooling means for varying enthalpy includes
(a) a heat exchanger having heat exchange walls in contact with said mixed phase medium and a flow path for a heat transfer medium; and
(b) means for connecting said heat exchanger flow path with one of the flow paths of the gas turbine power plant.

6. The combination defined in claim 1 in which the gas turbine power plant includes a flow path for leading a cooling medium through the cooling means; and in which the heating and cooling means for varying enthalpy comprises
(a) a heat exchanger having heat exchange walls in contact with said mixed phase medium and a flow path for a heat transfer medium; and
(b) selecting means for selectively connecting the heat exchanger flow path with one of two points on a flow path of the gas turbine power plant which are at different temperatures.

7. The combination defined in claim 6 in which the selecting means selectively connects the heat exchanger flow path with one of two points on the cooling medium flow path of the power plant which are at different temperatures.

References Cited by the Examiner
UNITED STATES PATENTS

| | | | |
|---|---|---|---|
| 1,557,557 | 10/1925 | Chaussepied | 60—36 |
| 2,352,187 | 6/1944 | Ellinwood | 60—54.5 X |
| 2,495,604 | 1/1950 | Salzmann | 60—59 X |
| 2,916,052 | 12/1959 | Peters | 138—30 |

FOREIGN PATENTS 465,802   5/1937   Great Britain.

EDGAR W. GEOGHEGAN, *Primary Examiner.*
JULIUS E. WEST, *Examiner.*